Dec. 29, 1959  L. J. KELLY ET AL  2,919,241
CONVERSION PROCESS AND APPARATUS WITH PLURAL
ADJACENT STAGES AND CENTRAL STRIPPING ZONE
Filed June 17, 1955

INVENTORS
CORNELIUS L. McNALLY
LOUIS J. KELLY
BY
ATTORNEYS

United States Patent Office 2,919,241
Patented Dec. 29, 1959

2,919,241

CONVERSION PROCESS AND APPARATUS WITH PLURAL ADJACENT STAGES AND CENTRAL STRIPPING ZONE

Louis J. Kelly, Tenafly, N.J., and Cornelius L. McNally, Woodside, N.Y., assignors to The M. W. Kellogg Company, Jersey City, N.J., a corporation of Delaware Application June 17, 1955, Serial No. 516,138

7 Claims. (Cl. 208—80)

This invention relates to improved method and means of converting hydrocarbons and, more particularly, it pertains to improved method and means which are especially effective for cracking high boiling hydrocarbon oils to lower boiling gasoline product by means of a fluid system. Still more particularly, the present invention is concerned with the segregation of feed material to a catalytic cracking operation and the separate treatment of the segregated materials under optimum cracking conditions.

In commercial practice of the fluid catalytic cracking process, fresh feed material is charged to a cracking zone, with or without recycle feed, without regard for the optimum conditions under which the various portions of the feed material can be converted for maximum production of gasoline. With respect to the cycle oil which boils usually in the gas oil range, it is found that this material is highly refractory. Under the conditions required for optimum conversion of cycle oil to gasoline, fresh or straight run feed material is overcracked, because the conditions are too severe for optimum production of gasoline. Still further, it is noted that the conventional "side by side" cracking units involve expensive equipment when adapted to accommodate segregated treatment of feed portions for optimum production of gasoline. On the other hand, systems in which the regenerator is positioned above the reactor and in which multiple standpipes and multiple feed entry points are normally used, are unusually effective for the segregated treatment of feed materials for conversion to gasoline. Accordingly, the present invention is concerned with method and means for adapting such units to segregated treatment of feed materials for optimum production of gasoline.

In accordance with the present invention, a process for converting hydrocarbons is provided which comprises contacting a first hydrocarbon reactant in the presence of a fluidized mass of finely divided contact material in a first reaction zone, contacting a second hydrocarbon reactant with a fluidized mass of finely divided contact material in a second reaction zone positioned adjacent to said first reaction zone but separated therefrom, withdrawing solid material from at least one of the reaction zones and passing the same to a stripping zone wherein any volatile hydrocarbons are stripped therefrom, passing the stripped solids to a regeneration zone positioned above the reaction zones and the stripping zone and in vertical alignment therewith for regeneration treatment, and passing a portion of regenerated solids downwardly as a substantially vertical column to at least one of the reaction zones.

For the purpose of this invention, in the broad aspect, the apparatus comprises a first enlarged containing means, a second containing means of substantially reduced cross-sectional area relative to the enlarged containing means and positioned centrally or symmetrically therein, partition means positioned within said enlarged containing means whereby the latter is divided to form at least first and second contacting zones, the contacting zones being adapted to contain fluidized masses of finely divided solid material, a third containing means of enlarged cross-sectional area positioned above and in vertical alignment with said first enlarged containing means, upflow means positioned within the second containing means and adapted to convey finely divided solid material from the second containing means to the third containing means, at least one downflow means adapted to convey finely divided solid material from the third containing means to at least one of the contacting zones, means for passing fluid material to the contacting zones and means for passing fluid material to the containing means.

The modifications of the present invention are adapted for use on a type of unit in which the regenerator is positioned above the reactor. This includes two types of units, namely, (1) the system in which the regenerator is superimposed on the reactor and (2) the system in which the regenerator is superimposed above the reactor but separated therefrom to provide space between the vessels. The latter system is commonly referred to as a "double head" unit; whereas the first mentioned unit is referred to as the "single head" unit. The present invention applies to either system; consequently, it should be understood that the description to be given hereinafter for one system applies equally well to the other system. In its broadest aspect, the present invention is concerned with partitioning the reactor such that it is divided into at least two reaction zones for segregated treatment of feed materials. The partitioning means by which the reactor vessel is separated into a plurality of reaction zones can be accomplished by a vertical, transverse baffle means which is sufficiently long to maintain the fluidized beds in the two or more reaction zones separated from each other; however, in one aspect of this invention the reaction products can be combined in a common disengaging zone. In another aspect of the invention, the partitioning or baffling means can be arranged to provide separate disengaging zones for the respective reaction zones. The partitioning means can provide any number of reaction zones, e.g., two or more separate zones by dividing the reaction means or reactor vessel into the corresponding number of zones, e.g., two, three, or four separate reaction zones. However, it should be understood that a greater number of reaction zones can be provided within the scope of this invention. In order to maintain a simplified design, the spent catalyst from the separate reaction zones is passed to a common stripping zone which, for the purpose of economical apparatus design and uniform catalyst withdrawal, is positioned centrally within the reactor vessel. However, in the case where unusually large quantities of feed material are handled, it is within the scope of this invention to provide more than one stripping means for the purpose of handling spent catalyst. Similarly, the stripped catalyst is conveyed or transported by means of an upflow means or conduit which is positioned vertically within the stripper. In this manner, a single riser conduit is employed for the purpose of handling stripped catalyst; however, more than one upflow conduit can be employed for the purpose of this invention in the case where large quantities of feed material are being processed.

Various schemes of processing feed material are contemplated within the scope of this invention. In one aspect, the reactor is divided into two separate reaction zones by means of a vertical, transverse baffle. The reaction zones in one aspect of this invention are substantially equivalent in size, hence, the vertical, transverse baffle lies in a single plane and is connected to the stripper. Since the stripper is positioned centrally with the reaction means, the transverse baffle is in two sections, one end of each section being connected to the reactor vessel at opposite sides of the reactor; whereas the other or inner ends of the baffle sections are connected to opposite sides of the stripper. A riser or upflow means is positioned centrally within the stripper for upward flow of contact material to the regenerator, which is positioned above the reactor. By partitioning the reactor into two separate zones, catalyst can be circulated by various alternative schemes. In one method of circulating catalyst, freshly regenerated solid material is first passed downwardly into one of the reaction zones, and then the catalyst is passed to the other reaction zone through a louver or aperture, baffled or otherwise, which is present in the section of the baffle dividing the reaction zones. Subsequently, the spent catalyst in the last reaction zone is passed to the stripping zone through an aperture or louver which is present in the stripper. As an alternative scheme, the reaction zones can be provided with separate downflow means or standpipes from the regenerator for the supply of freshly regenerated catalyst. The spent catalyst from each of the reaction zones is passed to the stripper through apertures or baffled louvers in the stripper. In still another alternative scheme for accomplishing the present invention, the reactor is divided into four reaction zones. Standpipes for the supply of freshly regenerated catalyst are present in two of the reaction zones and apertures or baffled louvers are provided in two of the baffle sections or partitioning means for the flow of catalyst from one reaction zone to the other as in the situation described above for the two-reaction zone reactor. Subsequently, the spent catalyst is passed from the last reaction zone in the series to the stripper by means of apertures or baffled louvers provided therein. Still another modification would involve using three reaction zones with one, two, three or more standpipes for the introduction of freshly regenerated catalyst to one, two, or three of the reaction zones. The spent catalyst from the reaction zone containing the standpipe may be passed successively to one or two of the other reaction zones depending upon the number of standpipes being used for the purpose of catalyst circulation.

The method and means of the present invention can be employed for the purpose of converting hydrocarbons. The hydrocarbon conversion process can be, for example, catalytic cracking, desulfurization, hydrogenation, hydroforming, dehydrogenation, isomerization, coking, and the like. In each instance, the finely divided solid or contact material is maintained in a fluidized state within each of the reaction zones described hereinabove as well as the regeneration zone. The fluidization of the solid material can be accomplished by passing upwardly therethrough a fluid material which is gaseous or vaporous under the conditions existing within the process zone at a superficial gas velocity of about 0.1 to about 6 feet per second, more usually, about 0.4 to about 2.5 feet per second. The finely divided solid material can have a particle size ranging from about 1 to about 250 microns, more usually, about 10 to 150 microns. The finely divided solid material can be inert or it can possess catalytic properties, however, in any event, the solid material becomes contaminated with a combustible material, for example, carbonaceous material, and it becomes necessary to remove at least part of the combustible material from the solid material by combustion with an oxygen containing gas. The regeneration treatment is effected at a temperature of about 700° to about 1200° F., more usually, about 950° to about 1150° F. In addition to the regeneration treatment, it may be necessary to subject the solid material to a stripping treatment for the removal of volatile material therefrom such as, for example, hydrocarbons, hydrogen, and the like. In this connection, the stripping treatment is effected in a separate stripping zone by means of a gasiform stripping agent, e.g., steam, flue gas, nitrogen, carbon dioxide, and the like. The stripping treatment can be effected under the same temperature and pressure conditions as exist in one or more of the reaction zones.

The present invention is particularly applicable for the cracking of high boiling hydrocarbon oils. In this respect, various combinations of feed treatment are contemplated by means of this invention. In one aspect, a high-boiling hydrocarbon oil is cracked in one reaction zone; whereas the cycle oil produced from that particular operation is cracked in another reaction zone. The conditions of treatment are selected to provide optimum conversion to gasoline material. In this kind of process, the feed material has an API gravity of about 10° to about 30°, an initial boiling point of about 350° to about 500° F. and an end point of about 1000° or above. The fresh feed is a straight run or virgin stock, consequently, it is desired to treat the same to effect a conversion of about 30 to about 55 percent on a 430° F. plus basis, more usually, a 430° F. plus conversion of about 40 to about 45 percent. The cycle oil stock resulting from the treatment is a highly refractory material boiling in the gas oil range. The cycle oil has an API gravity of about 10° to about 30°, an initial boiling point of about 350° to about 450° F. and an end point of about 900° to about 1050° F. In the treatment of the fresh feed material, the temperature is maintained within the range of about 950° to about 1050° F. and at a pressure of about 1 atmosphere to about 50 p.s.i.g. The weight space velocity measured as the pounds of oil being charged to the reaction zone per hour per pound of catalyst present therein, is about 0.5 to about 6.0, more usually, about 2.0 to about 3.0. The catalyst to oil ratio, on a weight basis, is about 4.0 to about 15.0, more usually, about 8.0 to about 12.0. The cycle oil treatment is effected at a lower temperature, namely, in the range of about 850 to about 950° F., and at a pressure of about 1 atmosphere to 50 p.s.i.g., more usually, about 3 to about 20 p.s.i.g. The weight space velocity is about 0.3 to about 10.0, more usually, about 0.8 to about 1.8. In the case where the catalyst for the cycle oil treatment is supplied from the zone in which the fresh feed is cracked the catalyst to oil ratio for the cycle oil treatment is a function of the fresh feed catalyst to oil ratio and fresh feed conversion and is about 5.0 to about 25.0, more usually, about 14.0 to about 20.0. The oil rate can be regulated by the addition of heavy feed or the deletion of cycle oil as product with resulting variation in the catalyst-oil ratio. The catalyst circulation in this case is fixed by the fresh feed requirement.

Alternatively, the fresh feed and cycle oil are treated differently. That is, the fresh feed is cracked at the lower temperature and lower space velocity and the cycle oil is cracked at the higher temperature and higher space velocity.

In still another aspect of this invention, it is contemplated treating separately straight run or virgin stocks under different conditions for the optimum production of gasoline. In this connection, the feed material may be a wide boiling range hydrocarbon fraction having an initial boiling point of about 350° to about 450° F., and an end point of about 1000° F. and above. There is at least 550° F. difference between the initial boiling point and the end point of the stock, consequently, it is generally referred to as a "wide boiling range material." In view of the widely different kinds of feed fractions, it is desirable to subject the same to a separate treatment for the production of at least two separate feed fractions. In this connection, the higher boiling feed fraction has an initial boiling point of about 600° to about 800° F. and an end point of about 1000° or above, and the lower boiling feed fraction has an initial boiling point of about 350° to about 450° F., and an end point of about 650° to about 850° F. The lower boiling feed fraction is fed to a reaction zone under conditions to provide a 430° F. plus conversion of about 35 to about 50 percent, and the high boiling feed fraction is cracked under conditions to effect a 430° F. plus conversion of about 35 to about 50 percent. In the case of cracking a low boiling fraction, the temperature is about 950° to about 1050° F., the pressure is about 10.0 to about 20.0 p.s.i.g., the weight space velocity is about 2.0 to about 5.0, and he catalyst to oil ratio is about 8.0 to about 15.0. The high boiling feed fraction is cracked at a temperature of about 875° to about 975° F., a pressure of about 10.0 to about 20.0 p.s.i.g., a weight space velocity of about 0.5 to about 2.0 and a catalyst to oil ratio of about 6.0 to about 12.0.

In still another aspect of this invention, it is contemplated treating the cycle oil stocks which are produced as a result of cracking the high boiling and low boiling feed fractions discussed above. The cycle oil stock which is roduced from cracking the low boiling feed fraction is termed for the purpose of this invention as the "light cycle oil." The light cycle oil has an API gravity of about 30° to about 35°, an initial boiling point of about 350° to about 450° F. and an end point of about 600° to about 650° F. The cycle stock which is produced from cracking the high boiling feed fractions is termed as the "heavy cycle oil," and it has an API gravity of about 15° to about 25°, an initial boiling point of about 550° to about 600° F. and an end point of about 900° F. or higher. The light cycle oil is treated under the same conditions as the light feed or under conditions to provide a 430° F., plus conversion of about 35 to about 50 percent; whereas the heavy cycle oil is treated under the same conditions as the heavy feed or under conditions to provide a 430° F., plus conversion of about 35 to about 50 percent. The light cycle oil is cracked at a temperature of about 950° to about 1050° F., a pressure of about 10 to about 20 p.s.i.g., a weight space velocity of about 2.0 to about 5.0 and a catalyst to oil ratio of about 8.0 to about 15.0; whereas the heavy cycle oil is cracked at a temperature of about 875° to about 975° F., a pressure of about 10 to about 20 p.s.i.g., a weight space velocity of about 0.5 to about 2.0, and a catalyst to oil ratio of about 6.0 to about 12.0.

The feed material to be treated in accordance with this invention can be a gas oil, reduced crude, a residual oil or mixtures of the foregoing materials. These feed materials are cracked by means of a suitable cracking catalyst, usually a siliceous catalyst. The siliceous catalyst can contain about 15 to about 100 percent silica, although, more usually, it contains about 60 to about 95 percent by weight of silica. Specific examples of the catalyst are silica-alumina, silica-boria, silica-magnesia, silica-zirconia, and the like, and catalyst in which three components are present, as well as mixtures of two catalysts such as silica-alumina and silica-magnesia.

Referring to the accompanying drawings.

Figure 1:
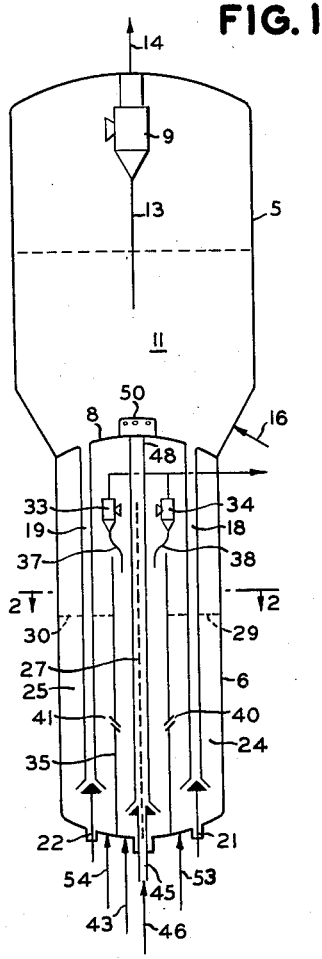
Figure 1 is a specific embodiment involving a reactor containing two reaction zones supplied with freshly regenerated catalyst.

In the drawing, Figure 1 shows a converter in which a vertical, cylindrical regenerator 5 superimposes a vertical, cylindrical reactor 6. The two vessels are separated by a common partition 8. The inside of the regenerator 5 contains a cyclone separator 9 by which a substantial part of entrained catalyst fines is recovered and returned to the dense bed 11 by means of a dipleg 13. The flue gas resulting from the combustion of carbon on the catalyst is discharged from the system by means of the line 14. Part of the air which is employed in the combustion of the carbon on the catalyst is fed to the bottom of the regenerator 5 by means of the line 16. In this example, the catalyst is silica-alumina and it contains about 2 percent by weight of carbon in the spent condition. The catalyst is regenerated at a temperature of 1100° F. and at a pressure of about 8 p.s.i.g. The regenerated catalyst is returned to the reactor vessel 6 by means of the two standpipes 18 and 19. The control of catalyst flow is maintained by means of the plug valves 21 and 22 which are associated with the standpipes 18 and 19, respectively, and serve to regulate the openings through which regenerated catalyst flows into reaction zones 24 and 25.

The reaction zones 24 and 25 are formed by means of a vertical, transverse baffle 27 which extends above the level of the catalyst in each reaction zone. Accordingly, the reaction zone 24 has a bed level 29 and the reaction zone 25 has a bed level 30. The bed levels may be the same or different. The baffle 27 extends above the beds 29 and 30 a sufficient distance to prevent the catalyst from intermingling between the two zones; however, the reaction products obtained from these reaction zones commingle after leaving the reaction beds at a point above the baffle 27. The entrained catalyst fines in the total reaction product are separated by means of the cyclones 33 and 34 and the recovered catalyst is returned to the stripper 35 positioned centrally within the reactor vessel 6 by means of the diplegs 37 and 38 associated with the cyclones 33 and 34, respectively. The spent catalyst from the reaction zones 24 and 25 is withdrawn from the respective zones by means of the louvers 40 and 41 in the stripper 35. The louvers are positioned to permit the withdrawal of catalyst from the respective reaction zones without effecting any intermingling of catalyst between the reaction zones.

Following the withdrawal of catalyst from the reaction zones, it is passed downwardly in the stripper 35 which is a vertical, cylindrical vessel of reduced cross-sectional area relative to the reaction vessel 6. Stripping gas is fed to the bottom of the stripper by means of the line 43. Spent catalyst is withdrawn from the stripper by means of a hollow plug valve 45 to which air is fed by means of the line 46 at a rate sufficient to convey the catalyst upwardly at the desired rate through the riser 48. The spent catalyst flows upwardly in the riser 48, and it is discharged into the regenerator by means of a distributor 50 which contains perforations or openings for the admission of upflowing material to the regenerator. The oil feed materials to the respective reaction zones 24 and 25 are dissimilar, hence, the feed material to the reaction zone 24 is supplied by means of the line 53; whereas the feed material to reaction zone 25 is supplied by means of the line 54. It can be seen from the description of the apparatus that the dissimilar feed materials are processed in separate reaction zones, thus providing for cracking of dissimilar hydrocarbon materials under conditions producing the optimum yield of gasoline product.

The following specific example will serve to illustrate the difference in conditions under which the materials can be processed. For this purpose, a heavy gas oil having an initial boiling point of about 450° F., and an end point of about 1000° F., is passed to the reaction zone 25 by means of the line 54; whereas a heavy deasphalted gas oil having an initial boiling point of 650° F., and a 50 percent point of about 900° F., is passed to reaction zone 24 by means of the line 53. The following conditions are employed for the cracking of these materials:

| Conditions | Reaction zone 24 | Reaction zone 25 |
|---|---|---|
| Reaction: | | |
| Temperature, °F | 900 | 960 |
| Pressure, p.s.i.g | 17 | 17 |
| Weight space vel., W./hr/W$_c$ | 1 | 2 |
| Catalyst to oil ratio | 6 | 15 |
| Stripping: | | |
| Temperature, °F | 900 | 960 |
| Pressure, p.s.i.g | 17 | 17 |
| Regeneration: | | |
| Temperature, °F | 1,100 | 1,100 |
| Pressure, p.s.i.g | 8 | 8 |
| Air rate, lb./hr | 236,120 | 110,000 |

Figure 2:
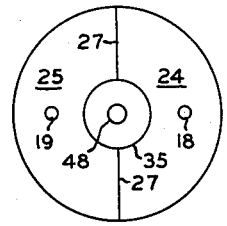
Figure 2 is a view in section taken on liens 2—2 of Figure 1 and looking in the direction of the arrows.

Figure 2 is a cross-sectional view taken along line 2—2 of Figure 1. The riser 48 and stripper 35 are positioned concentrically with respect to each other and also in concentric relation with respect to the reactor vessel 6. The baffle 27 is composed of two sections; the outer end of each section is connected to the opposite sides of the reactor 5 and the inner end of each section is connected to the opposite sides of the stripper 35. Further, the standpipes 18 and 19 are positioned symmetrically within the reaction zones 24 and 25 to provide for an even distribution of freshly regenerated catalyst within the respective zones. However, the reaction zones, if desired, can be of different sizes.

Figure 3:
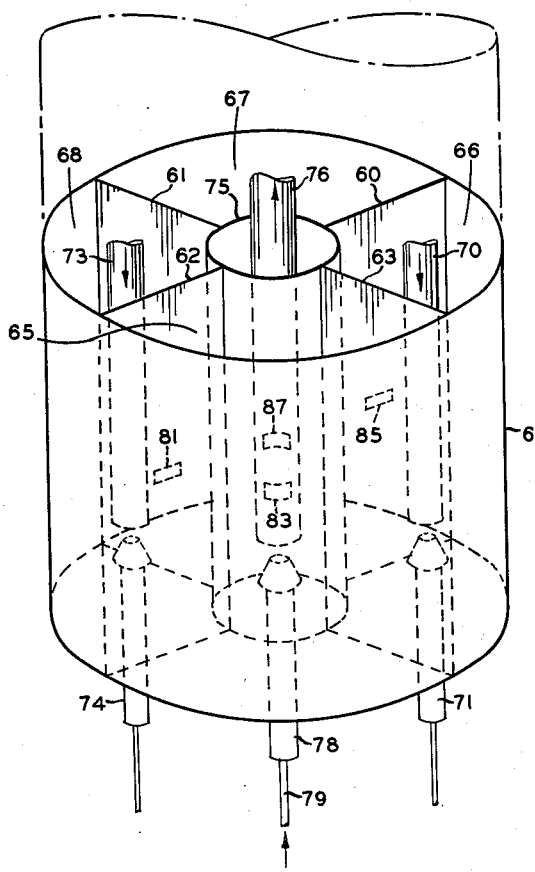
Figure 3 is an isometric view of a reactor containing four reaction zones, two of said reaction zones contain standpipes for supplying freshly regenerated catalyst.

Figure 3 is a modification showing a further division of the reactor vessel 6 into four sections. In this embodiment, the reactor vessel 6 is divided into four sections by means of vertical transverse baffles 60, 61, 62 and 63, thus providing reaction zones 65, 66, 67 and 68. Standpipes for the introduction of freshly regenerated catalyst are provided for supplying regenerated catalyst to the reaction zones 66 and 68. The standpipe 70 discharges into the bottom part of the reaction zone 66, and the rate of catalyst supply is controlled by means of the plug valve 71. Similarly, the standpipe 73 discharges freshly regenerated catalyst into the bottom part of the reaction zone 68, and the rate of introduction of catalyst is controlled by means of the plug valve 74. The stripper is positioned centrally within the reactor vessel 6 and the riser 76 is positioned concentrically within the stripper 75. A hollow plug valve 78 is employed for regulating the flow of stripper catalyst from the stripper and this is effected by passing gasiform material through the hollow plug valve 78 by means of the line 79. Freshly regenerated catalyst is fed to the reaction zone 68 by means of the standpipe 73. Catalyst is withdrawn from the reaction zone 68 for passage to the zone 65 by means of an aperture or louver 81 contained in the baffle 60. Consequently, catalyst flows from the reaction zone 68 to the reaction zone 65 by means of the aperture 81. The spent catalyst in the reaction zone 65 is withdrawn therefrom by means of an aperture 83 contained in the stripper 75. Similarly, freshly regenerated catalyst is fed to the reaction zone 66, and the catalyst is subsequently passed to the reaction zone 67 by means of an aperture 85 contained in the baffle 60. Spent catalyst is withdrawn from the reaction zone 67 by means of an aperture 87 contained in the stripper 75 in a substantially diametrically opposite position from the aperture 83.

It will be obvious to those skilled in the art that many modifications may be made within the scope of the present invention without departing from the spirit thereof, and the invention includes all such modifications.

We claim:

1. A process for the conversion of separate hydrocarbon feed streams of different boiling range to products of lower boiling range which comprises passing said hydrocarbon feed streams separately and in parallel flow arrangement through a plurality of separate and adjacent reaction zones containing a dense fluidized bed of catalytic material therein under selected operating conditions to effect the desired conversion therein, said plurality of reaction zones surrounding a common stripping zone and being in open communication with one another in the upper portion thereof above the upper level of said dense fluidized bed of catalyst therein, passing finely divided catalytic material serially through at least two of said plurality of reaction zones, withdrawing contaminated catalytic material from the last of said reaction zones in the series and passing the same to said stripping zone, stripping catalyst in said stripping zone, passing stripped catalyst from within the lower portion of said stripping zone upwardly as a confined stream to a regeneration zone above said plurality of reaction zones, regenerating catalyst in said reaction zone and passing regenerated catalyst substantially vertically downwardly as a confined stream to the first of said reaction zones in the series of catalyst flow.

2. A process for the conversion of separate hydrocarbon feed streams to products of lower boiling range which comprises passing said hydrocarbon feed streams separately and upwardly in parallel flow through a plurality of adjacent reaction zones, each of said reaction zones containing a dense fluidized bed of catalytic material in the lower portion thereof superimposed by a more dilute catalyst phase in the upper portion thereof under selected operating conditions to effect the desired conversion therein, passing finely divided catalytic material serially through at least two of said adjacent reaction zones, withdrawing contaminated catalytic material from the last reaction zone in the series and passing the same to a stripping zone, said reaction zones and said stripping zone being in open communication with one another in the upper dilute phase, stripping catalyst in said stripping zone, passing stripped catalyst substantially vertically upwardly from the lower portion thereof to a regeneration zone, regenerating catalyst in said regeneration zone and passing regenerated catalyst downwardly to the first of said reaction zones in the series of catalyst flow.

3. A process for converting hydrocarbons which comprises passing a first hydrocarbon reactant in contact with a dense fluidized mass of finely divided catalyst in a first reaction zone under selected operating conditions to effect conversion to desired products thereby contaminating the catalyst, passing the second hydrocarbon reactant in contact with a second dense fluidized mass of finely divided catalyst in a second reaction zone under selected conditions to effect conversion to desired products thereby contaminating the catalyst, passing catalyst from said first reaction zone below the upper dense phase level therein to said second reaction zone, passing contaminated catalyst from said second reaction zone below the upper dense phase level therein to a stripping zone, stripping catalyst in a dense fluidized condition in said stripping zone, commingling products of said first and second reaction zones with stripped products of reaction above the dense fluid bed of catalyst in said stripping zone, passing stripped catalyst from the lower portion of said stripping zone upwardly as a confined stream through said stripping zone to a regeneration zone there above, regenerating catalyst in said regeneration zone and returning regenerated catalyst substantially vertically downwardly as a confined stream to the lower portion of said first reaction zone.

4. A method for converting separate hydrocarbon feed streams of different refractivity in the presence of finely divided catalytic material which comprises withdrawing from a regeneration zone at least two parallel streams of finely divided catalytic material, passing each catalyst stream through a plurality of adjacent reaction zones adapted for sequential flow of catalytic material therebetween, all of said zones through which said separate catalyst streams are passed being in open communication with one another above a dense catalyst bed phase level maintained in each reaction zone, recovering contaminated catalyst from the last reaction zone of each series of zones and passing the same to a common stripping zone, stripping catalyst in said stripping zone, passing stripped catalyst to a regeneration zone above said plurality of adjacent reaction zones, passing said separate hydrocarbon feed streams of different refractivity at conversion conditions in contact with catalyst in each of said reaction zones for conversion to desired products and recovering products of each reaction zone with stripped products of reaction as a combined stream above said dense phase catalyst bed in said reaction zones.

5. A system for handling finely divided contact material in a plurality of reaction zones and contacting the same with separate hydrocarbon feed streams of different boiling range which comprises providing a plurality of separate reaction zones circumferentially positioned around a central stripping zone, maintaining a relatively dense fluidizing bed of contact material in each of said zones, passing at least two separate streams of freshly regenerated contact material through at least two separate series of reaction zones arranged for sequential flow of contact material therethrough, passing contact material from the last reaction zone of each of said series of zones to said stripping zone, passing said hydrocarbon feed streams of different boiling range separately to each of said reaction zones for conversion into desired products, recovering combined products of reaction from each of said reaction zones and said stripping zone above the dense bed of contact material in said stripping zone and passing stripped contact material to a regeneration zone.

6. An apparatus comprising in combination an elongated substantially vertical vessel of larger diameter in the upper portion than in its lower portion, a baffle member separating the upper enlarged portion from the lower portion of the vessel to form an upper regeneration chamber therein, an elongated open end cylindrical stripping chamber extending upwardly from the bottom of said vessel and terminating below said baffle member to form an annular chamber with said vessel, at least four equally spaced substantially vertical baffle members extending from the bottom of said annular chamber to substantially the upper level of said cylindrical chamber, said baffle members being contiguous with the wall of said stripping chamber and said vessel wall to separate said annular chamber into at least four reaction chambers, means for maintaining a relatively dense fluidized mass of finely divided contact material in each of said reaction chambers below the upper level of said vertical baffle members, slot means provided in the wall of said stripping chamber for passing contact material from at least one reaction chamber to said stripping chamber and slot means provided in at least one vertical baffle member to permit sequential flow of finely divided contact material between at least two adjacent reaction chambers prior to passing to said stripping chamber, substantially vertical conduit means for passing finely divided contact material from the lower portion of the stripping chamber substantially vertically upward to the lower portion of said regeneration chamber, conduit means for passing regenerated catalyst from the lower portion of said regeneration chamber to a reaction chamber constituting the first in a series of reaction chambers for sequential flow of contact material therebetween, means for separately introducing a reactant material into the lower portion of each of said chambers and means for removing a gaseous material from the upper portion of each of said chambers.

7. An apparatus comprising in combination a lower conversion chamber, an upper regeneration chamber, an open end cylindrical stripping chamber confined within and extending upwardly from the bottom of said conversion chamber and forming an annular chamber with the walls of said conversion chamber, an open end conduit extending from the lower portion of said stripping chamber into the bottom of said regeneration chamber, at least one substantially vertical baffle member in said annular chamber extending upwardly from the bottom thereof to provide a plurality of reaction chambers open at their upper ends within the annular space of said conversion chamber, slot means provided in the wall of said stripping chamber substantially above the bottom thereof for transferring finely divided contact material from at least every other reaction chamber to said stripping chamber, slot means provided in every other vertical baffle member separating said reaction chamber to provide for series flow of finely divided contact material between at least two adjoining reaction chambers prior to passing to said stripping chamber, means for introducing a gaseous material to the lower portion of each of said chambers, means for introducing a gaseous material to the bottom of said conduit, and means for removing a gaseous material from the upper portion of said conversion chamber and said regeneration chamber.

References Cited in the file of this patent

UNITED STATES PATENTS

| | | |
|---|---|---|
| 2,296,722 | Marancik et al. | Sept. 22, 1942 |
| 2,379,159 | Kanhofer | June 26, 1945 |
| 2,428,873 | Gunness et al. | Oct. 14, 1947 |
| 2,433,726 | Angell | Dec. 30, 1947 |
| 2,439,582 | Scheineman | Apr. 13, 1948 |
| 2,457,232 | Hengstebeck | Dec. 28, 1948 |
| 2,461,958 | Bonnell | Feb. 15, 1949 |
| 2,488,032 | Johnson | Nov. 15, 1949 |
| 2,710,279 | Siecke | June 7, 1955 |
| 2,829,955 | Goedkoop | Apr. 8, 1958 |

FOREIGN PATENTS

| | | |
|---|---|---|
| 290,580 | Switzerland | Aug. 1, 1953 |
| 1,089,281 | France | Sept. 29, 1954 |